Patented Feb. 13, 1951

2,541,689

UNITED STATES PATENT OFFICE 2,541,689

ADHESIVE AND LAMINATED STRUCTURE

Clarence M. Carson, Silver Lake, Ohio, assignor to Wingfoot Corporation, Akron, Ohio, a corporation of Delaware No Drawing. Application August 7, 1945, Serial No. 609,486

1 Claim. (Cl. 154—50)

This invention relates to a moisture-vapor-resistant adhesive and to a laminated structure comprising at least two plies of a sheet material bonded by means of a continuous film of the adhesive.

Laminated structures comprising at least two plies of synthetic film material, as for example those made of regenerated cellulose, rubber hydrochloride, etc., are well known, but these prior laminated structures have a moisture-vapor-transfer rate of a value which prevents their use as a protective wrapper in the sealing out of moisture from various items to be protected against moisture, as for example, metal parts, food, drugs, chemicals, etc.

It has been discovered that a satisfactory moisture-vapor-resistant laminated structure may be made of various synthetic films when the films are laminated and bonded together by means of a continuous film of an adhesive which has as its principal ingredients a synthetic rubber, a resin and a paraffin wax, properly blended and compounded.

In order to develop a moisture-vapor-resistant laminated structure of synthetic film that will have a moisture-vapor-transfer rate of less than 0.6 gram per 100 square inches of surface per 24 hours exposed under conditions of 100° F. with 0 percent relative humidity on one side of the structure and 95 percent relative humidity on the other side, it has been discovered that a continuous film of an adhesive comprising a synthetic rubber having a plasticity of not more than 25 Mooney and preferably between about 10 to about 20 Mooney, as determined by the method described in Industrial and Engineering Chemistry (analytic edition for March 13, 1934, pages 147–51), in an amount between about 9 percent to about 15 percent, a synthetic resin in an amount between about 37 percent and about 54 percent, and a paraffin wax in an amount between about 32 percent and about 53 percent, produces this result. These components are present each in an amount sufficient to make up a 100 percent composition. Solvent may be added in sufficient amount to make up a composition suitable for application as a lacquer coating. The composition may also be applied as a hot melt, and when so used the hot melt should have a viscosity of not more than about 100 seconds (Saybolt Furol).

In solving this problem concerning the production of a moisture-vapor-resistant laminated structure composed of at least two plies of a sheet material, it was necessary to be sure that the synthetic rubber-wax-resin adhesive had an adhesion strength of about 35 grams per inch up to about 100 grams per inch when tested on a Scott dynamometer wherein the jaws separate at a speed of 12 inches per minute. In addition to this adhesive strength which is necessary in order to properly bond the smooth surfaces of such films as those made of regenerated cellulose, rubber hydrochloride, etc., the adhesive must retain its moisture-vapor-resistant properties as well as its adhesive properties under adverse moisture conditions.

With respect to adhesive properties it will be found that most prior art paraffin wax adhesives have an adhesive strength of from 0 to about 10 grams per inch when tested under the Scott conditions. However, the adhesive of this invention may contain paraffin wax in amounts between about 32 percent and about 53 percent and still exhibit adhesive strengths from about 35 grams to about 1000 grams per inch when properly compounded with the other components.

The paraffin wax component of the present adhesive is used primarily for the purpose of reducing the moisture-vapor-transfer rate under the conditions above noted. It is preferred to use a paraffin wax having a melting point of 150° F. and a microcrystalline wax having a melting point of 150° F., singly or in varying combinations. The microcrystalline waxes, also referred to as amorphous waxes and as petrolatum waxes, suitable in this invention may be conveniently referred to as those being sold under the trade name Petrosene, sold by the Socony Vacuum Company, and Syncera, sold by Standard Oil Company of Indiana. Paraffin waxes are differentiated by softening points which may vary from 110° F.–180° F. and by source (i. e., oil field or refinery). Any of these different melting point paraffin waxes may be used.

The resin component adds strength to the adhesive and also enhances the bonding strength of the resulting adhesive, a property which is not present in the waxes or in sufficient degree in the synthetic rubber. Under certain conditions of compounding, the adhesive characteristic of the resin is destroyed when used in conjunction with the paraffin waxes and synthetic rubber, but under the conditions of this invention the adhesive characteristic of the resins used is not only maintained, but in some instances is enhanced. Thus, it may be seen that the components of this adhesive do not act alone, but act in combination with each other to produce a result not produced by any one of the components singly.

The resins which may be used in this invention may be any of a large number of various classes. Preferred classes of resins are the coumarone-indenes, the terpene polymers (an especially preferred class of resins), the chlorinated paraffins, the phenol-formaldehyde condensation resins, the Balata resins, the alkyds, the natural occurring resins, the cyclized-synthetic rubber resins, the cyclized-natural rubber resins, the chlorinated-synthetic rubber resins, the chlorinated-natural rubber resins. Specific coumarone-indene resins operable under the conditions of the present invention are the Cumars, melting between about 55° C. and about 125° C. and preferably those melting between about 77° C. and about 85° C., produced by the Barrett Company; Nevillac and Nevindene, both produced by the Neville Company; Paradene, produced by the Paramet Chemical Company, and Piccoumarin, produced by the Pennsylvania Industrial Chemical Company.

Preferred terpene polymers are those resulting from the polymerization of beta pinene, and from the polymerization of alpha pinene. Piccolyte may also be used, which is a terpene resin produced by the Pennsylvania Industrial Chemical Company.

Preferred chlorinated diphenyl resins are the resinous Arochlors, produced by the Monsanto Chemical Company.

Preferred phenol formaldehyde condensation resins are the class of materials exemplified by Beckacite 2000 and Beckacite 1100, both produced by the Reichhold Chemical Company; the phenol formaldehyde condensation resins commonly referred to and sold under the trade name Durez, and specifically Durez resin 202 and Durez resin 210, both produced by Durez Plastics and Chemicals, Inc.

It has been found that such alkyd resins as Petrex, a terpenemaleic anhydride reaction product produced by the Hercules Powder Company, and Teglac, produced by the American Cyanamide Company, are desirable.

Natural occurring resins, such as Balata resin, rosin, processed congo, copal, and modified rosins sold by the Hercules Powder Company under the trade names Stabelite and Pentalyn, are found desirable.

Any of the cyclized natural rubbers may be used in the present invention, particularly those cyclized rubber resins resulting from the treatment of natural rubber with stannic chloride, sulfuric acid, hydrochloric acid, amphoteric metal halides, sulfonic acids, sulfonyl chloride, benzene sulfonic acid, phenol and phenol sulfonic acid to alter the arrangement of the rubber molecule with respect to unsaturation, without altering the chemical composition.

Any of the cyclized synthetic rubber resins may be used, particularly the cyclized synthetic rubber resins resulting from the treatment of such synthetic rubbers as polyisoprene, polybutadiene, butadiene and styrene copolymers, with such cyclizing agents as stannic chloride, amphoteric metal halides, sulfuric acids, sulfonyl chloride, sulfonic acid, hydrochloric acid, phenol, phenol sulfonic acid and aluminum chloride.

Chlorinated synthetic rubber resins are operable in this invention and particularly those resulting from the chlorination of polyisobutylene, polyisoprene, butadiene-styrene, and isoprene-styrene.

Any of the chlorinated natural rubber resins are operable as the resin component of the adhesive of this invention, particularly the chlorinated natural rubber resin known in the trade as Parlon, produced and sold by the Hercules Powder Company.

The synthetic rubber component of the adhesive of this invention provides strength and flexibility and reduces the brittleness of the adhesive in its set state. The synthetic rubber also reduces the crystalline characteristic of those waxes possessing this characteristic, and particularly paraffin. It has been discovered that the high adhesive strength of the adhesive of this invention is obtained when using a synthetic rubber having a plasticity of not more than 25 Mooney, and maximum results are obtained when using a synthetic rubber having Mooney values between about 10 and about 20. Certain of the synthetic rubbers, such as, for example, polyisoprene, isoprene-styrene copolymer and butadiene-1,3-styrene copolymer, may be worked to such a sticky consistency that a "pressure-sensitive" adhesive results.

Any suitable film-forming synthetic rubber having a Mooney value of not more than 25 may be used, and preferably the synthetic rubber known as Buna S, which is a copolymer resulting from the copolymerization of butadiene and styrene, the copolymer resulting from the copolymerization of isoprene and styrene, the polymer resulting from the polymerization of isoprene, the polymer resulting from the polymerization of butylene, butyl rubber, neoprene and any of the other well known synthetic rubbers which have an elasticity or stretch characteristic of at least about 300 percent, are operable. This stretch characteristic is sufficient to exclude any of the so-called rubber-resins. Therefore, by the term "synthetic rubber" used in the specification and in the appended claim, is meant a substance having a stretch characteristic of at least 300 percent.

It has been discovered that certain combinations of synthetic rubber and paraffin waxes may be made without the use of a plasticizer, whereas other combinations of synthetic rubbers and paraffin waxes require the use of a plasticizer.

Representative examples of adhesives of this invention are given in the following table:

TABLE 1

| Ex. | Synthetic Rubber | Per Cent | Resin | Per Cent | Wax | Per Cent | Plasticizer | Per Cent |
|---|---|---|---|---|---|---|---|---|
| 1 | Buna-S (1) | 9 | Staybelite (2) | 44 | P & M (3) | 43 | Hercolyn (4) | 4 |
| 2 | ----do---- | 9 | ----do---- | 44 | M (3A) | 43 | ----do---- | 4 |
| 3 | ----do---- | 9 | ----do---- | 44 | P & M (3) | 43 | ----do---- | 4 |
| 4 | Buna-S-C-1 (11) | 15 | ----do---- | 40 | Paraffin (12) | 45 | | |

| Ex. | Solvent | Sheet Material, Laminated | M. V. T. R. Reduced— From— | M. V. T. R. Reduced— To— | Adhesion | Remarks |
|---|---|---|---|---|---|---|
| 1 | Spirits (5) | Vinylite (6) | 2.2 | 0.60 | high (7) | 73% M. V. T. R. reduction. |
| 2 | Toluene | Vinylite (8) | 0.50 | 0.09 | good (9) | 82% M. V. T. R. reduction. |
| 3 | Spirits (5) | Vinylite-RH (10) | 0.75 | 0.30 | ----do---- | 60% M. V. T. R. reduction. |
| 4 | ----do---- | Vinylite (8) | 0.50 | 0.11 | ----do---- | 78% M. V. T. R. reduction. |

LEGEND:
(1) Butadiene-1,3—styrene copolymer 85/15 ratio.
(2) Hydrogenated rosin.
(3) Paraffin, M. P. 150° F. (25%)—microcrystalline wax, M. P. 150° F. (18%).
(3A) Microcrystalline wax, M. P. 150° F.
(4) Hydrogenated methyl ester of rosin.
(5) Textile spirits (a gasoline fraction boiling from 70–90° C.).
(6) Vinyl chloride-vinyl acetate copolymer 40/60 ratio.
(7) 600 grams per inch.
(8) Vinyl chloride-vinyl acetate copolymer 92/8 ratio, vinyl chloride-vinylidene chloride copolymer 50/50 ratio.
(9) 300–500 grams per inch.
(10) Rubber hydrochloride film—polyvinyl chloride acetate—polyvinylidene vinyl chloride film laminate.
(11) Butadiene-1,3—styrene copolymer, 85/15 ratio—cyclized polyisoprene mixture, 5% and 10% respectively.
(12) Paraffin, M. P. 150° F.

Further representative types of the adhesive of this invention are given in the following table:

TABLE 2

| Ex. | Synthetic Rubber | Per Cent | Resin | Per Cent | Wax | Per Cent | Plasticizer | Per Cent |
|---|---|---|---|---|---|---|---|---|
| 1 | Isoprene-S (1) | 13.8 | Staybelite (2) | 50 | P & M (4) | 32.8 | Hercolyn (5) | 3.4 |
| 2 | Isoprene-S (1) | 13.1 | Cumar R3 (3) / Balata (9) | 3.3 / 41.2 | P & M (10) | 42.4 | | |
| 3 | Isoprene-S (1) | 13.1 | Cumar R3 (3) / Balata (9) | 3.3 / 41.2 | P & M (10) | 42.4 | | |
| 4 | Isoprene-S (1) | 13.1 | Cumar R3 (3) / Balata (9) | 3.3 / 41.2 | P & M (10) | 42.4 | | |
| 5 | Polyisoprene-C (15) | 5.0 | Staybelite (2) | 40 | P & M (10) | 45.0 | Vistac (17) | 10.0 |
| 6 | Polyisoprene | 12.5 | Cumar R3 (3) | 37.5 | P & M (21) | 50 | | |
| 7 | Polyisoprene | 12.5 | Cumar R3 (3) | 37.5 | P & M (21) | 50 | | |

Data on Examples 1–7—continued.

| Ex. | Solvent | Sheet Matel Laminated | M. V. T. R. Reduced— From— | M. V. T. R. Reduced— To— | Adhesion | Remarks |
|---|---|---|---|---|---|---|
| 1 | Spirits (6) | Pliofilm (7) | .32 | .21 | good (8) | 28% M. V. T. R. reduction. |
| 2 | ----do---- | ----do---- | .32 | .21 | ----do---- | 28% M. V. T. R. reduction. |
| 3 | ----do---- | RH-glassine (11) | .60 | .40 | good (12) | 33% M. V. T. R. reduction. |
| 4 | ----do---- | RH-cellophane (13) | .60 | .40 | good (14) | 33% M. V. T. R. reduction. |
| 5 | ----do---- | Vinylite (18) | 1.25 | .88 | fair (19) | 30% M. V. T. R. reduction. |
| 6 | Gasoline | Cell. Acetate | 2.00 | 1.50 | fair (22) | 25% M. V. T. R. reduction. |
| 7 | ----do---- | RH-C. A. (23) | .60 | .45 | fair (24) | 25% M. V. T. R. reduction. |

LEGEND:
(1) Isoprene-styrene copolymer 85/15 ratio.
(2) Ester of hydrogenated rosin.
(3) A coumarone-indene resin melting at 80° C.
(4) Paraffin, M. P. 150°—19%; microcrystalline wax, M. P. 150° F., 13.8%.
(5) Hydrogenated methyl ester of rosin.
(6) Textile spirits (a gasoline fraction boiling 70–90° C.).
(7) Rubber hydrochloride.
(8) 300–500 grams per inch.
(9) Balata resin.
(10) Paraffin, M. P. 150° F.—23.15%; microcrystalline wax, M. P. 150°—19.25%.
(11) Rubber hydrochloride-glassine laminate.
(12) 300–500 grams per inch.
(13) Rubber hydrochloride-cellophane laminate.
(14) 300–500 grams per inch.
(15) Cyclized polyisoprene.
(16) Paraffin, M. P. 150° F.
(17) Polybutylene having a molecular weight of about 1000.
(18) Vinyl chloride-vinylacetate copolymer 92/8 ratio, vinyl chloride-vinylidene chloride copolymer 50/50 ratio.
(19) 100–300 grams per inch.
(21) Paraffin, M. P. 134° F.—10%; microcrystalline wax—10%.
(22) 100–300 grams per inch.
(23) Rubber hydrochloride-cellulose acetate laminate.
(24) 100–300 grams per inch.
(25) Cyclized polyisoprene-styrene copolymer 85/15 ratio.
(26) 100–300 grams per inch.

In each of the examples the solvent is added in an amount sufficient to facilitate spreading of the adhesive on the film to be laminated. The adhesive may have a solids content ranging from between about 25% to about 50%. Where plasticizers are necessary, they are to be used in the minimum amount required for flexibility, since they reduce the resistance of the adhesive to moisture-vapor-transfer. However, it is to be noted that where plasticizers are used in the foregoing tables, the combination of components are such that the moisture-vapor-transfer rate is well below the minimum requirements consistent with the desirable adhesive values. Representative plasticizers are Hercolyn (the hydrogenated methyl ester of rosin), dimethyl naphthalene, Vistac (polybutylene), castor oil, the sebacates and the phthalates.

The moisture-vapor-transfer rate values given in the above tables are based upon the grams of water that pass through 100 square inches of exposed surface during a 24 hour interval when placed under conditions of 100° F. at 0%-95% relative humidity differential.

The values of the moisture-vapor-transfer rate (M. V. T. R.) given in the tables under "From" are those values obtained using a two ply sheet in which two separate films are positioned one against the other without any material interposed between these two films. The values for M. V. T. R. given in the tables under "To" are those values obtained when the film material is laminated together with a continuous film of the adhesive of this invention. Reductions in M. V. T. R. of from about 25 percent to about 82 percent are obtained, depending upon the film used. The M. V. T. R. of commercially available films range from about .75 gram to about 2.0 grams per 100 square inches for a single film of a given thickness. Generally the reduction in M. V. T. R. achieved by the use of two of these films in laminated relation without the use of an adhesive is about 50 percent, and where three films are used in laminated relation is about 66 percent. However, it has been shown in the foregoing tables that where the third film is the adhesive of this invention, operating as a bonding agent between the two films being laminated, the reduction in M. V. T. R. is as high as 82 percent in addition to the percent reduction obtained when two films are held in laminated relation without the use of any adhesive.

In addition to operating as a bonding agent and as a moisture-vapor-resistant barrier for sheet materials, the adhesive of this invention may also act as a carrier for other chemicals during its use as a bonding agent in the lamination of sheet materials. For instance, in packaging foods, it may be advantageous to use an inhibitor of mold in the adhesive layer rather than to place the mold in the film, provided the mold is diffusible through the film. Decorative effects may be attained in laminated structures which are to be fabricated into a package by using dyes, colors, or metallic powders in the adhesive.

From the foregoing description it may be seen that there has been provided by this invention a new adhesive composition and an article of manufacture in which many desirable advantages have been successfully achieved. Since many possible variations of this invention may be made, it is to be understood that all matter hereinbefore set forth is to be interpreted as illustrative and not in a limiting sense. Suitable changes may be made in the details of the process without departing from the spirit or scope of the invention, the proper limits of which are defined in the appended claim.

I claim:

A laminated structure comprising at least two plies of rubber hydrochloride, each ply bonded to another ply by means of a continuous film of a moisture-vapor-resistant adhesive comprising a rubbery copolymer having a plasticity of not more than 25 Mooney and resulting from the copolymerization of a mixture of butadiene-1,3 and styrene, the rubbery copolymer being present in an amount between 9% and 15%, a coumarone-indene resin melting between 55° C. and about 125° C. in amount between 37% and 54%, and a mixture of microcrystalline wax and paraffin wax in amount between 32% and 53%, the components of the adhesive being present in an amount totalling 100%, and a solvent for the components of the adhesive.

CLARENCE M. CARSON.

REFERENCES CITED

The following references are of record in the file of this patent:

UNITED STATES PATENTS

| Number | Name | Date |
|---|---|---|
| 2,054,116 | Abrams | Sept. 15, 1936 |
| 2,142,039 | Abrams | Dec. 27, 1938 |
| 2,290,392 | Thomas | July 21, 1942 |
| 2,319,389 | Corkery et al. | May 18, 1943 |
| 2,366,219 | Soday | Jan. 2, 1945 |
| 2,382,731 | Little | Aug. 14, 1945 |